June 16, 1953 T. A. STEHLIN 2,642,256
VALVE
Filed April 19, 1949

THEODORE A. STEHLIN,
INVENTOR.

BY William B. Hall
ATTORNEY.

Patented June 16, 1953

2,642,256

UNITED STATES PATENT OFFICE 2,642,256

VALVE

Theodore A. Stehlin, Pasadena, Calif.

Application April 19, 1949, Serial No. 88,440

9 Claims. (Cl. 251—39)

My present invention relates to valves, and particularly to valves which are readily demountable.

One of the principal objects of this invention is to provide a fluid-control valve in which the valve seat may be readily removed and renewed.

Another important object of this invention is to provide a valve of this class in which the valve seat member may be readily reversed or transposed for another portion of the valve.

An important object also of this invention is to provide a valve of this class in which the valve member may be easily removed from the outlet end of the valve housing by first removing the valve operating means and the valve seat member.

A further important object of this invention is to provide simple means for resiliently forcing and holding the movable valve member against its seat.

A still further important object of this invention is to provide a valve of this class which as a whole is very simple and economical of construction and operation.

With these and other objects in view, as will appear hereinafter, I have devised a valve having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Figure 1:
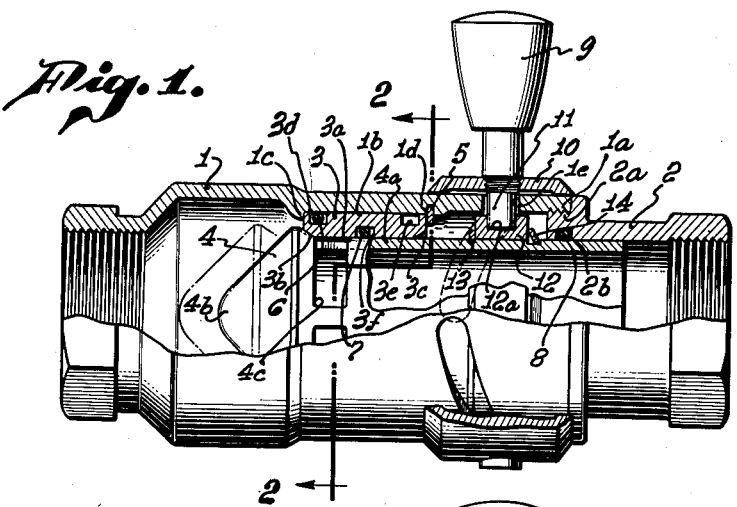
Fig. 1 is a partial longitudinal sectional and partial elevational view of a fluid-control valve incorporating my invention in one form.

The housing of my valve, shown in the drawings, is of general cylindrical form, consisting of housing members 1 and 2 screwably secured end to end, the forward end of the housing member 2 being externally threaded at $2^a$ and screwed into a threaded portion $1^a$ at the rear end of the housing member 1. The valve shown is of a line-type valve, the outer ends of the housing being connected in any suitable manner to two sections of a pipe line, the outer end of the housing member 1 being considered as the inlet end.

The housing member 1 has a continuous cylindrical bore $1^b$ in which is removably fitted an annular or sleeve-valve seat member 3, in the bore $3^a$ of which is slidably mounted the sleeve portion $4^a$ of a valve member 4. The forward end of the valve member engages an annular shoulder $1^c$ extending inwardly of the bore $1^b$. It is held against the shoulder $1^c$, or substantially so, by a resilient snap retaining ring 5 located at the rear end of the valve seat member. The retaining ring 5 is located within an annular groove $1^d$ in the housing member 1.

The forward and rear ends of the valve seat member are provided with conical cone seats $3^b$ and $3^c$. When the valve seat member is in the position shown, the enlarged valve portion $4^b$ is adapted to engage the seat $3^b$. When the valve seat member is reversed, when it is desired to renew the seat, the valve portion $4^b$ engages the seat $3^c$.

The valve seat member has two peripheral grooves $3^d$ and $3^e$ near its opposite ends for receiving a resilient sealing ring 6, which may be in the form of an O-ring. There may be only one sealing ring 6 which is located in the forwardly positioned groove. When the valve seat member is reversed, the sealing member 6 is located within the groove $3^e$.

Within the wall of the bore of the valve seat member is an annular groove $3^f$ for receiving a sealing ring 7, which is preferably in the form of an O-ring. This O-ring 7 is positioned against the moving wall of the sleeve portion of the valve member. It will be noted that the sealing O-ring is at all times positioned behind the radiating ports $4^c$ at the forward end of the bore of the sleeve portion of the valve member, these ports being located immediately behind the enlarged valve portion $4^b$.

The rear end of the valve member extends slidably within the forward portion of the housing member 2. It is sealed with respect to such housing member by means of a sealing O-ring 8, which is located within an annular groove $2^b$ in the bore of the housing member 2, as shown in Fig. 1.

The valve member 4 may be unseated, and shifted generally in an axial direction, by means of a handle 9 secured to and extending radially from a collar 10 encircling the peripheral portion of the housing. This collar 10 has a valve-shifting pin or pins 11 which extends radially inwardly through a helical slot $1^e$. The inner end of this pin extends into a recess $12^a$ in a valve-shifting collar 12, which is located and retained between two snap rings 13 and 14 located in spaced annular grooves in the sleeve portion of the valve member. The snap ring 13 serves as a shoulder for limiting the forward position of the collar 12 with respect to the valve member, and the snap ring 14 holds the collar against the ring 13. It will be here noted that the snap ring 14 is of a particular shape, being normally positioned at an angle, and resiliently forces the collar against the ring 13. With this construction the valve-actuating collar 12 is prevented from effecting a rigid engagement and binding between the valve member and its seat, but allows merely a yieldable and resilient engagement of the two.

Figure 3:
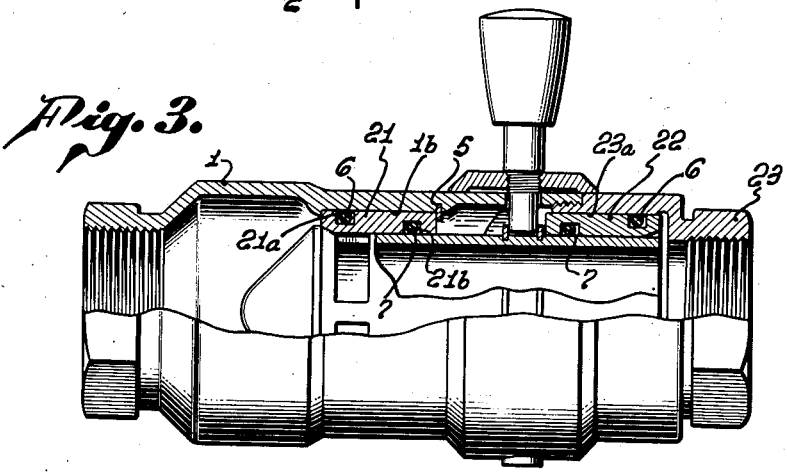
Fig. 3 is a view similar to that shown in Fig. 1 of a modified form of my valve; and, Fig. 4 is a fragmentary sectional view, showing the removable mounting of a valve seat member of my invention in another modified form.
Figure 2:
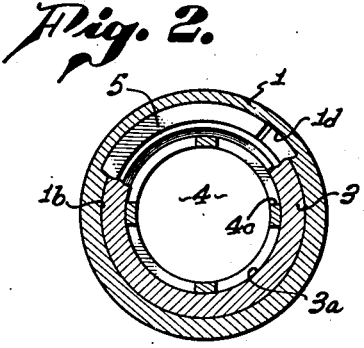
Fig. 2 is a transverse sectional view thereof, taken through 2—2 of Fig. 1.

In the modification shown in Fig. 3, separate members, namely, 21 and 22, may serve separately as valve seat members. They are constructed identically but have only two grooves for sealing members 6 and 7. these two grooves, in the member 21, namely, grooves $21^a$ and $21^b$ corresponding with the grooves $3^d$ and $3^f$ in the valve seat member, shown in Fig. 1. The valve seat member 21 is also held in position by a snap ring 5. In this modified form the valve seat member 22 is loosely positioned within a bore 23ᵃ in the rear housing member 23, the bore 23ᵉ being of the same diameter of the bore 1ᵇ. In this modified construction, the rear valve seat member, which is the member 22 in this instance, is also provided with sealing rings 6 and 7 which seal the space between the exterior portion of the sleeve portion of the valve member with respect to the bore 23ᵃ of the rear valve housing member.

In this modified form, the valve-actuating member may also be located between two snap rings, as shown.

It will be here noted that the whole valve may be demounted from the rear portion of the forward housing member 1. In Fig. 1 the rear housing member 2 is first unscrewed. The other members may be removed in the following order, namely: ring 14, pin 11, valve-actuating member 12, ring 13, ring 5, and valve seat member 3. In the modified form shown in Fig. 3, they may be removed in the following order, namely: rear valve-housing member 23, valve seat member 22, ring 14, pin 11, ring 13, ring 5, and valve seat member 21.

Figure 4:
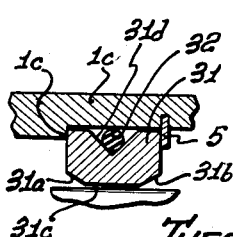

In the modified structure shown in Fig. 4, an extremely simple valve seat member 31 is employed. This member is a relatively short sleeve and has cone seat portions 31ᵃ and 31ᵇ at the opposite ends of its bore 31ᶜ. This valve seat member has only one peripheral groove 31ᵈ for receiving a sealing ring 32. The valve seat sleeve or member 31 is also removably held in place against a shoulder 1ᶜ by means of a snap ring 5. In this instance also, the valve seat member 31 may be reversed so that either valve seat may be used.

In this instance, the inner sealing ring is omitted so that there is no sealing with respect to the valve member when the latter is open.

I wish it to be understood that I do not desire to be limited to the exact details of construction shown and described, for obvious modifications will occur to a person skilled in the art.

I claim:

1. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a valve-member reciprocating collar removably fitted around and intermediate the ends of the rear portion of the valve member, the valve member having a shoulder for limiting the forward position of the collar, a resilient snap ring engaging the rear side of the collar, the latter ring being removably fitted into groove means in thhe valve member, for holding the collar against the shoulder of the valve member, and means operable through the housing in the collar for axially shifting the valve member.

2. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member and provided with a radial port behind the head communicating with the interior of the sleeve, the wall of the bore of the valve seat member having an annular groove, a sealing member in the latter groove, a valve-member reciprocating collar removably fitted around and intermediate the ends of the rear portion of the valve member, the valve member having a shoulder for limiting the forward position of the collar, a resilient snap ring engaging the rear side of the collar, the latter ring being removably fitted into groove means in the valve member, for holding the collar against the shoulder of the valve member, and means operable through the housing in the collar for axially shifting the valve member.

3. In a valve of the class described, a housing having a cylindrical passage therethrough, a valve seat member in the passage, a sleeve valve member reciprocally mounted within the passage and adapted to engage the valve seat member, the sleeve of the valve member being axially slidable through the bore of the valve seat member, the wall of the bore of the valve seat member having an annular goove, a sealing member in the latter groove, a valve-member reciprocating collar removably fitted around and intermediate the ends of the rear portion of the valve member, the valve member having a shoulder for limiting the forward position of the collar, a resilient snap ring engaging the rear side of the collar, the latter ring being removably fitted into groove means in the valve member, and being resilient with respect to the longitudinal axis of the valve member for holding the collar against the shoulder of the valve member, and means operable through the housing in the collar for axially shifting the valve member.

4. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a valve-member reciprocating collar removably fitted around and intermediate the ends of the rear portion of the valve member, the valve member having a shoulder for limiting the forward position of the collar, a resilient snap ring engaging the rear side of the collar, the latter ring being removably fitted into groove means in the valve member, and being resilient with respect to the longitudinal axis of the valve member for holding the collar against the shoulder of the valve member, and means operable through the housing in the collar for axially shifting the valve member.

5. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a valve-member reciprocating collar removably fitted around and intermediate the ends of the rear portion of the valve member, the valve member having a shoulder for limiting the forward position of the collar, a resilient snap ring engaging the rear side of the collar, the latter ring being removably fitted into groove means in the valve member, for holding the collar against the shoulder of the valve member, and means operable through the housing in the collar for axially shifting the valve member, said snap ring being removable for removing the collar and valve seat member through the rear end of the housing.

6. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a peripherally-grooved, valve-member reciprocating collar removably fitted around and intermediate the ends of the rear portion of the valve member, resilient snap rings engaging the forward and rear sides of the collar, the foremost of the latter rings serving as a shoulder and the rearmost of the latter rings being removably fitted into groove means in the valve member, for holding the collar against the shoulder of the valve member, and means operable through the housing in the collar for axially shifting the valve member.

7. In a valve of the class described, a housing having a cylindrical passage therethrough, a valve seat member in the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a peripherally-grooved, valve-member reciprocating collar removably fitted around and intermediate the ends of the rear portion of the valve member, resilient snap rings engaging the forward and rear sides of the collar, the foremost of the latter rings serving as a shoulder and the rearmost of the latter rings being removably fitted into groove means in the valve member, and being resilient with respect to the longitudinal axis of the valve member for holding the collar against the shoulder of the valve member, and means operable through the housing in the collar for axially shifting the valve member.

8. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a peripherally grooved, valve-member reciprocating collar removably fitted around and intermediate the ends of the rear portion of the valve member, resilient snap rings engaging the forward and rear sides of the collar, the foremost of the latter rings serving as a shoulder and the rearmost of the latter rings being removably fitted into groove means in the valve member, and being resilient with respect to the longitudinal axis of the valve member for holding the collar against the shoulder of the valve member, and means operable through the housing in the collar for axially shifting the valve member.

9. In a valve of the class described, a housing having a cylindrical passage therethrough, a shoulder in the passage, a valve seat member removably positioned in the passage against the shoulder, a retaining ring for removably securing the valve seat member against said shoulder, the valve seat member having an annular peripheral groove, a sealing ring positioned in the groove against the wall of the passage, a sleeve valve member reciprocally mounted within the passage and adapted to engage the valve seat member, the sleeve of the valve member being axially slidable through the bore of the valve seat member, the wall of the bore of the valve seat member having an annular groove, a sealing member in the latter groove, a peripherally-grooved, valve-member reciprocating collar removably fitted around and intermediate the ends of the rear portion of the valve member, resilient snap rings engaging the forward and rear sides of the collar, the foremost of the latter rings serving as a shoulder and the rearmost of the latter rings being removably fitted into groove means in the valve member, for holding the collar against the shoulder of the valve member, and means operable through the housing in the collar for axially shifting the valve member, said snap ring being removable for removing the collar and valve seat member through the rear end of the housing.

THEODORE A. STEHLIN.

References Cited in the file of this patent

UNITED STATES PATENTS

| Number | Name | Date |
|---|---|---|
| 937,513 | Deiller | Oct. 19, 1909 |
| 1,740,669 | Shaff | Dec. 24, 1929 |
| 2,182,278 | Brauer | Dec. 5, 1939 |
| 2,413,869 | Hamer | Jan. 7, 1947 |
| 2,424,331 | Rose | July 22, 1947 |